Dec. 26, 1950  W. J. POCH  2,535,547
TELEMETERING SYSTEM
Filed Sept. 10, 1946  3 Sheets-Sheet 1
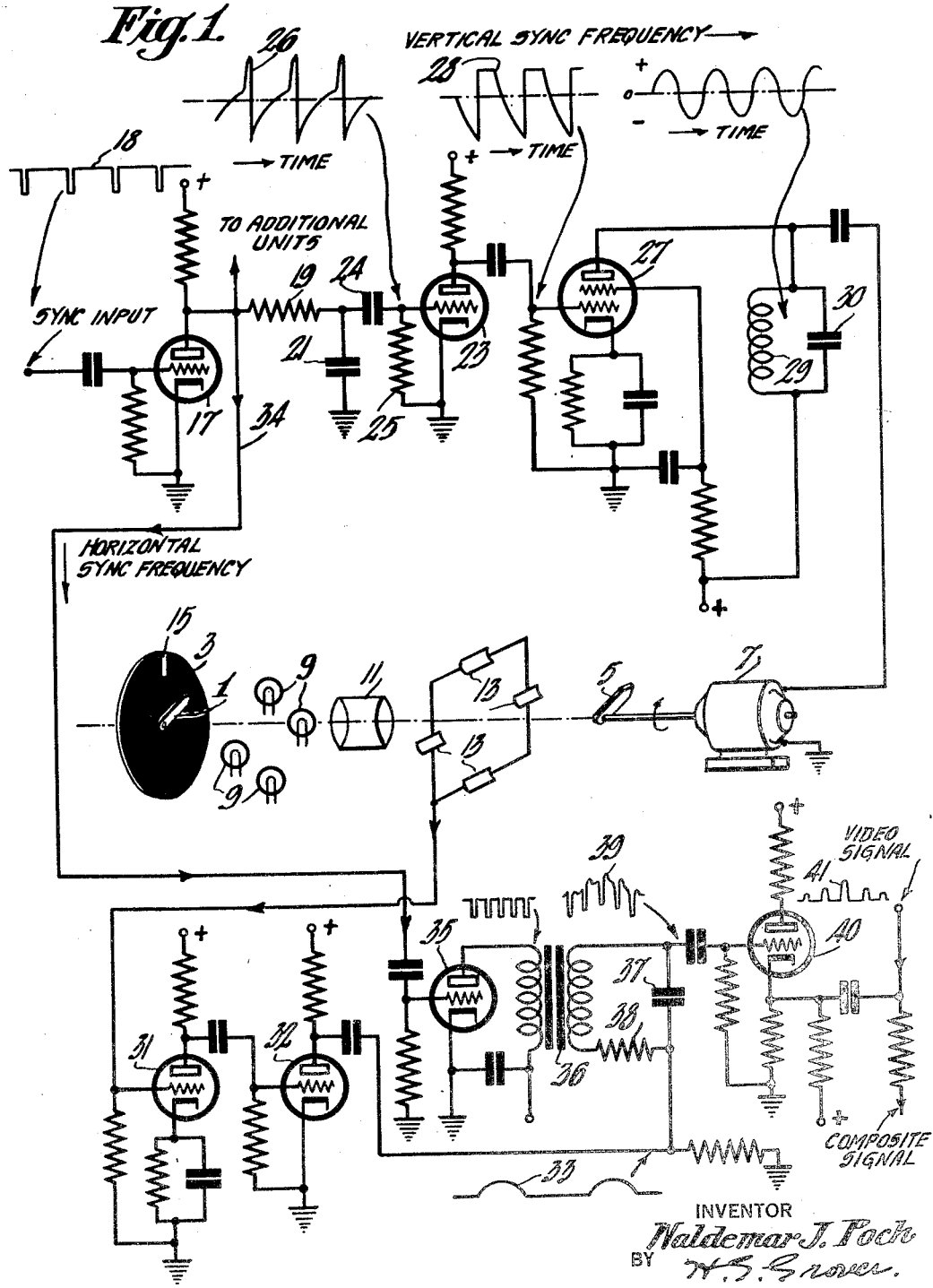
INVENTOR
Waldemar J. Poch
BY H. S. Snover
ATTORNEY

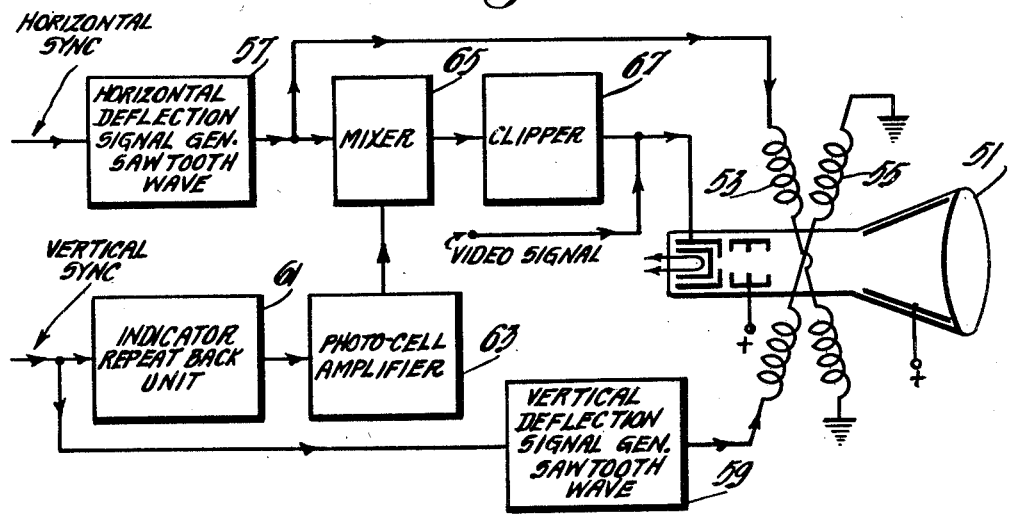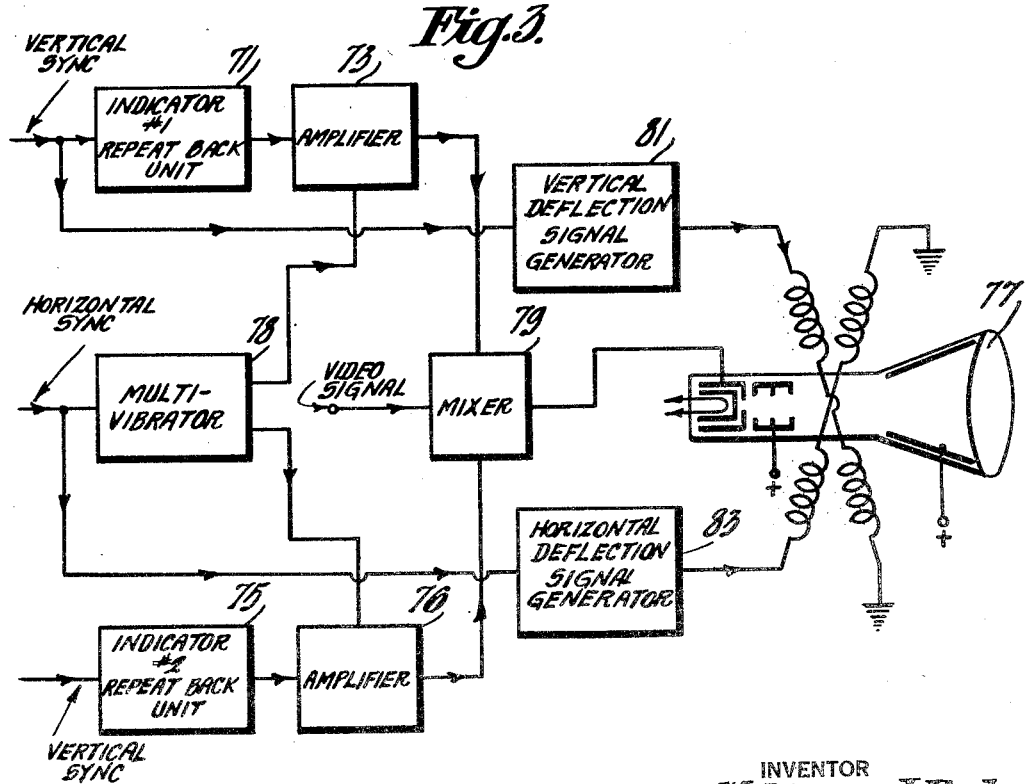

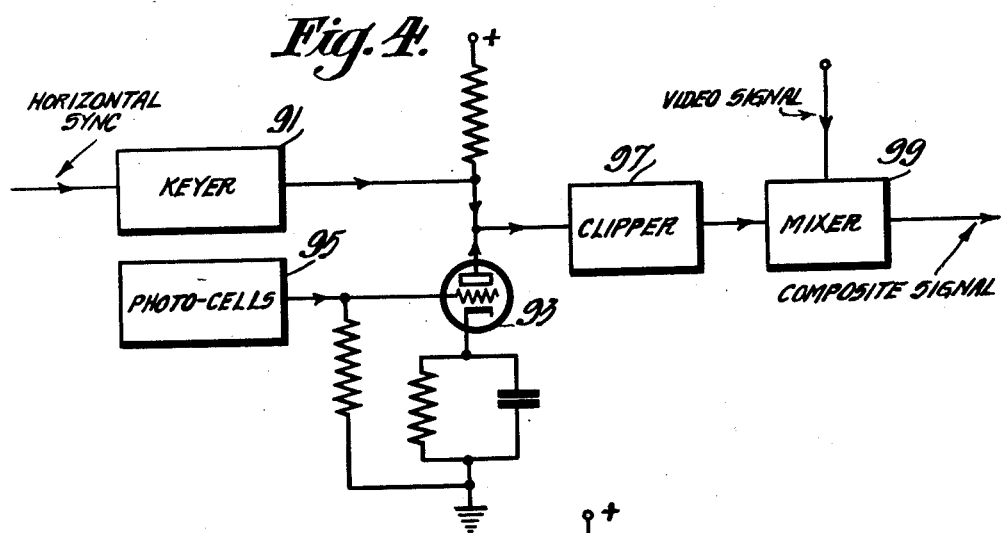
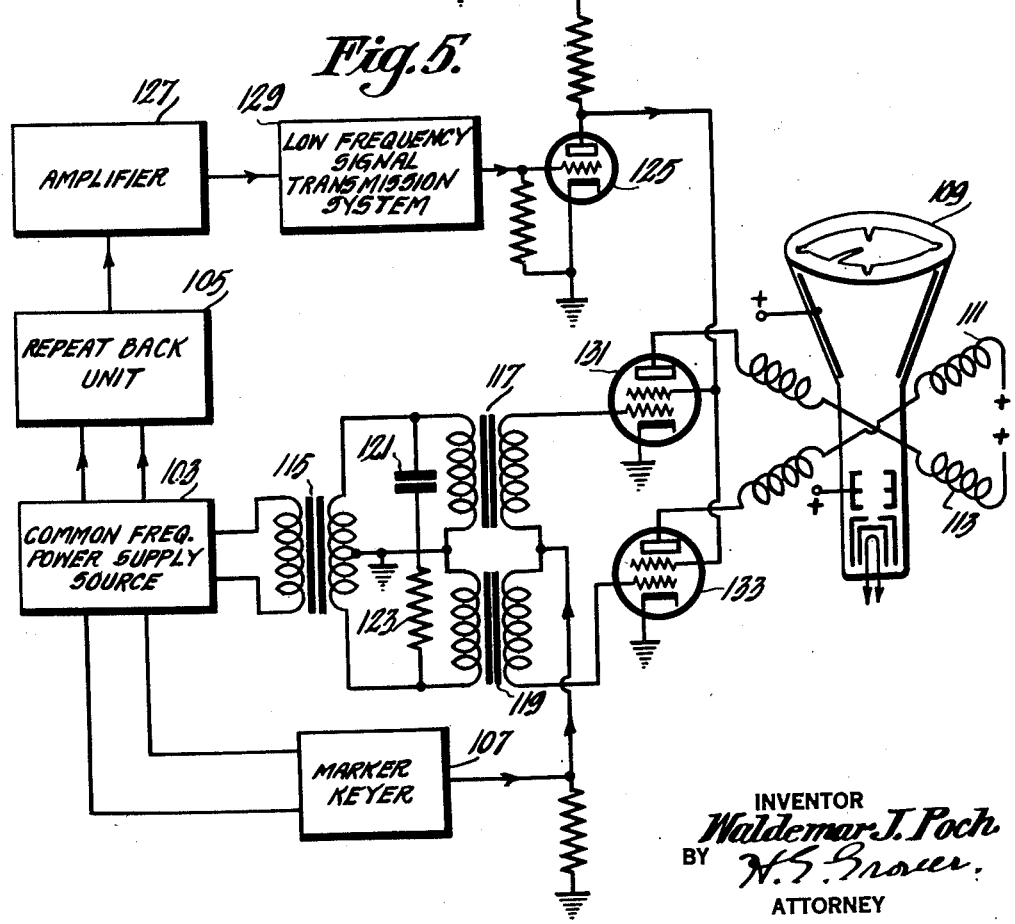

Patented Dec. 26, 1950

2,535,547

UNITED STATES PATENT OFFICE 2,535,547

TELEMETERING SYSTEM

Waldemar J. Poch, Moorestown, N. J., assignor to Radio Corporation of America, a corporation of Delaware Application September 10, 1946, Serial No. 695,845

6 Claims. (Cl. 177—351)

This invention relates to telemetering systems, and more particularly to the electrical transmission of indicator readings in conjunction with a television system.

It often becomes desirable for many television system applications to have, in addition to the principal image transmission, a remote indication of one or more indicating devices.

There are fundamentally two systems which may be employed for the transmission of such information. The first fundamental system is an optical one. In the optical system, the face of the meter or indicating device can be remotely projected optically in a manner similar to that of the principal image. This fundamental system has some disadvantages in that a portion of the principal image area must be specifically allotted to the optical reproduction of the indicating device, thus limiting in size and shape the available area for the principal image. In the case of the optical system of transmitting indicator readings, it is not always convenient to project the image of the indicating device on a separate image tube. Furthermore, it is often desirable to transmit to a remote point information obtained from more than one indicating device. It will be seen that in the positioning of more than one indicating device in the area allotted for the transmission of the principal image, the question of space allocation can become serious.

The electrical system for the transmission of indicator information provides a medium for transmission of meter readings and the like without interference with the transmission of other intelligence. A plurality of indications can be transmitted simultaneously by suitably arranging and adjusting circuit constants and equipment.

There are two different systems for changing the reading of the meter or indicating device into a usable electrical signal. The first contemplates the conversion of the electrical information of the meter or indicating device directly into a signal that can be added to the video signal from the camera. The second system employs what may be called circular scanning on the face of the meter or indicating device. This requires no physical connection to the meter needle, since the signal may be obtained by photoelectric methods. The latter system is preferable, in view of the drag or inertia which may be imparted to the pointer of the meter or indicating device by the attachment thereto of electrical brushes, contacts, or the like.

Scanning systems are subject to the limitation that the vertical return time obscures the signal over part of the cycle, however, scanning systems have one outstanding advantage over all the known conversion systems. Calibration marks can be scanned by the same pointer that is used to scan the indicator dial, and calibration marks may be introduced directly into the electrical circuit. In other systems, unless a complex electrical circuit is used for the introduction of calibration marks, the kinescope phase itself must be calibrated, and the calibration must be checked and corrected quite often, since calibration changes with the vertical size, distribution and phase characteristic of the receiver. Another advantage of the scanning system is that with only minor variations of the unit, nearly any type of indicating device may be substituted.

According to this invention, an electrical system is provided for the transmission of indicator readings in combination with a video signal, and the electrical representation is derived from the indicating device by circular scanning.

A primary object of this invention is to provide an improved telemetering system.

Another object of this invention is to transmit indicator readings, together with other intelligence signals, without mutual interference.

Still another object of this invention is to provide an improved scanning device to provide an electrical signal representative of the reading of said indicating device.

A still further object of this invention is to properly synchronize and combine the electrical signals representative of the reading of an indicating device with video signals of an associated television system.

Other and incidental objects of the invention will be apparent to those skilled in the art from a reading of the following specification and an inspection of the accompanying drawing in which Figure 1 is a schematic diagram showing a preferred form of this invention;

Figure 2 is a block diagram showing this invention in another of its preferred forms;

Figure 3 is a block diagram illustrating another preferred form of this invention;

Figure 4 is also a block diagram showing still another form of this invention; and Figure 5 is a schematic diagram illustrating the practice of this invention in another of its preferred forms.

Turning now in more detail to Figure 1, there is shown an indicating device 1 which may, for example, be a compass needle associated with a black or dark color background 3. A pointer 5 having a shape similar to that of pointer 1 is driven by synchronous motor 7. The pointer 1 is illuminated by lamps 9, and the image of pointer 1 is focused in the plane of rotation of pointer 5 by a lens system 11.

A bank of photocells 13 is positioned adjacent to pointer 5 to pick up the light reflected from pointer 5.

The position of the lamps 9 and the bank of photocells 13 may be interchanged.

The operation of the indicator repeat back unit described above is as follows. When the pointer 1 is illuminated by lamps 9, an image of the illuminated pointer 1 is formed in the plane of rotation of pointer 5. As pointer 5 is rotated at a predetermined rate, pointer 5 will coincide with the position of the optical image of pointer 1 at one point in its rotation. When the optical images of pointer 1 and pointer 5 coincide, a light flash will cause the bank of photocells 13 to generate a signal pulse. The time relationship of the signal pulse with respect to the phase of the electrical energy driving the synchronous motor 7 will be dependent upon the angular position of pointer 1.

A reference mark 15 is placed in the dial 3 to provide a reference signal. The reference signal pulse resulting from the reference marker 15 will be obtained in a manner similar to the signal pulse derived from the pointer 1. That is, the optical image of the reference marker 15 will also be in the plane of rotation of pointer 5 so that a light flash will be obtained when the pointer 5 rotates through the optical image of reference marker 15.

The relative position of pointer 1 and reference marker 15 will therefore be indicated by the relative timing of the two electrical pulses obtained from the bank of photocells 13.

Several different methods of synchronously driving the pointer 5 are available; a D. C. motor synchronized by a tone wheel or a magnetic brake, an automatic frequency controlled motor, or a synchronous motor.

A D. C. motor properly synchronized is satisfactory and is well known in the art. The automatic frequency controlled motor uses a D. C. motor run at a speed near the desired synchronous speed. A pulse voltage at the same frequency as the frequency of rotation of the motor is obtained from a commutator. This pulse is added to the synchronizing pulse and the resulting signal is rectified, giving a D. C. voltage proportional to the phase between the two pulses. This voltage can be fed back into the field of the D. C. motor, thus causing its speed to be in accordance with the frequency of the incoming synchronizing pulses. The latter, the synchronous motor, is probably the simplest of the three systems and is particularly adaptable in the practice of this invention.

For the purpose of securing constant calibration, it is necessary that the motor have a single lock-in position of the rotor. This requirement makes necessary a magnetically polarized rotor. A two-pole motor is required since the motor must make a complete rotation per frame. If a motor has two lock-in positions, the indicator reading with a system of this type can be off by 180°, and so a check must be made each time the unit is started to see that it locks in the correct phase. The motor must also have a stable lock-in characteristic in order to prevent jitter in the indicator reading.

There are two fundamental methods for running a synchronous motor from synchronizing pulses such as the vertical synchronizing pulses employed in television systems. In one method, the synchronizing pulses are used to synchronize a frame frequency sine wave oscillator, and the output of this oscillator is used to run the synchronous motor. However, this system has the disadvantage that, when the synchronous pulses fail, the motor continues to run at a speed near the proper frequency. The indicating device continues to give a reading under these conditions, but the reading will drift with respect to the scanning operation. This condition is likely to result in an incorrect reading if the drift is very slow. To alleviate such a possibility, a driven system is more desirable.

Synchronizing pulses are applied to the control electrode of tube 17. The synchronizing signal may, for example, be of the type utilized in the synchronization of scanning of an associated television system. The form of synchronizing impulses employed in television systems is shown and described beginning on page 158 of "Principles of Television Engineering" by Donald G. Fink, published in 1940.

The synchronizing signal contains a horizontal synchronizing pulse and a vertical synchronizing pulse. The frequency of repetition of the horizontal synchronizing pulse is much greater than the frequency of recurrence of the vertical synchronizing pulse.

In providing the synchronous motor 7 with driving energy, it is desirable to use only the lower frequency of recurrent pulses or the vertical synchronizing frequency. The vertical synchronizing frequency is therefore separated from the composite synchronizing signal by the use of the low pass filter including resistor 19 and condenser 21. A system suitable for separating synchronizing signals from video signals and separating the horizontal and vertical pulses from each other is shown and described in the U. S. patent to A. V. Bedford, No. 2,207,775, dated July 16, 1940.

The vertical synchronizing pulses obtained from the low pass filter including resistor 19 and condenser 21 are applied to the control electrode of tube 23. The tube 23 is so biased that the peak of the synchronizing pulse causes tube 23 to draw grid current, thus charging the grid side of the coupling condenser 24 negative. The charge leaks off through the grid leak 25, thus applying a sawtooth wave voltage shown in curve 26 to the control electrode of tube 23. This sawtooth wave voltage is amplified in tube 23 and is fed to tube 27 where the sawtooth wave is of such an amplitude that tube 27 draws grid current on the peaks of the sawtooth wave, clipping off the top of the wave as indicated in curve 28. This clipped sawtooth wave has a good form factor and it is fed to the oscillatory circuit including coil 29 and condenser 30. The oscillatory circuit including inductance 29 and condenser 30 are tuned to the frequency of the vertical synchronizing pulses.

It will be seen that no power will be supplied motor 7 if the synchronizing pulse input fails.

It will also be seen that pointer 5 will be rotated at a frequency in synchronism with the timing of the vertical synchronizing pulses. The light flashes resulting from the coincidence of the pointer 5 with the image of pointer 1 and its associated marker 15 will therefore recur in accordance with the synchronizing frequency so that the signal pulses generated in the bank of photocells 13 will be synchronized with the framing of the associated television system.

The output signal pulses of the bank of photoelectric cells 13 are amplified in tube 31 and passed to clipper tube 32. The clipper or limiter amplifier tube 32 is so biased that it normally is conducting saturation current. Positive pulses on the grid cannot, therefore, greatly affect the plate current. Negative pulses on the grid, however, cut down the flow of plate current. The voltage at the plate of tube 32 therefore rises during the signal pulses and there is produced in the output of tube 32 a series of positive pulses whose timing is in accordance with the orientation of pointer 1 and marker 15 with respect to the timing of the synchronizing pulses. The wave form is shown in curve 33.

The photocell amplifier including tube 31 must be properly designed so that enough high frequency response is maintained to pass a very sharp 40 cycle pulse, and the low frequency response must be good enough to prevent any of the pulses from being differentiated. More explicitly, since the indicator marker pulse which moves with respect to the fixed marker pulse must be able to come very near to the fixed marker pulse, differentiation must be completely absent to prevent the moving pulse from being obliterated by combination with the fixed pulse.

The width of the signal pulse obtained from the bank of photocells 13 is dependent upon the width of the pointers 1 and 5. The indicator needle or pointer 1 and the scanning pointer 5 must have a finite width, and since the two pointers move past each other in the scanning process, the light flash produced will have a time interval equal to the sum of the width of the two pointers 1 and 5. A lower limit is set on the size of the pointers, since the signal from the photocells 13 must be above the noise level of the associated amplifiers and the upper limit of size is set by the accuracy of the reading required.

For all practical purposes, the width of the pointers 1 and 5 should be as small as possible while still securing a voltage above the noise level.

Furthermore, the calibration mark 15 corresponding to a fixed point on the compass or indicating device is necessary and the reference marker must be easily distinguishable from the compass bearing or position pointer 1. This is achieved by making the reference mark 15 as narrow as possible consistent with good signal output, and then making the indicator pointer 1 wider. The flash of light reflected from the indicator pointer 1 will be larger than the light reflected from the marker 15 so that the two can be readily identified. An improvement may be had if the pointers and reference marks are made wedge shaped with the apex pointing toward the axis of rotation.

When the signal pulses generated by the indicator repeat back unit are combined with a video signal for presentation on an image tube in connection with a television image, the reproduction will appear as horizontal bars on the kinescope image. These horizontal bars or lines tend to interfere with the image. The lines, however, can be shortened by employing the horizontal synchronizing frequency to provide a horizontal keying pulse and thus position the indication at any place on the horizontal lines which is, for example, only at the beginning of the horizontal lines.

As was previously explained, tube 17 passes both the horizontal and vertical synchronizing pulses. The horizontal synchronizing pulses or the high frequency pulses are passed through connection 34 and applied to the control electrode of tube 35 where they are amplified and passed to transformer 36.

The secondary of transformer 36 contains a tuned oscillatory circuit whose frequency is equal to the frequency of the horizontal synchronizing pulses. The oscillatory circuit contains as inductance the secondary of transformer 36 and capacity 37. The oscillatory circuit also contains resistor 38, which is utilized to provide highly damped oscillation.

The voltage provided by the tuned circuit containing the secondary of transformer 36, condenser 37 and resistor 38 is added to the voltage output of tube 32. The combined voltages will produce a voltage such as that shown in curve 39.

Tube 40 is so biased that it passes current only during the time interval occupied by both the signal pulses obtained from the bank of photocells 13 and the positive cycle of the oscillatory voltage. The output signal from tube 40 will therefore take the form of curve 41 and will be such that, when combined with the video signal as indicated in the drawing, will cause a visual indication only at one position along the horizontal scanning lines of the image tube. The position on the scanning lines of the indication can be adjusted by providing a delay circuit in the horizontal synchronizing frequency transmission circuit 34.

Although only a single pointer 1 and a single marker 15 are illustrated, a plurality of concentric pointers and markers may be used. Reproduction of all pointer indications and markers will appear simultaneously on the reproducing device.

In Figure 2 there is shown an image producing tube 51 having horizontal deflecting coils 53 and vertical deflecting coils 55. Energy for horizontal deflection of the electron beam developed within the tube 51 is obtained from the horizontal deflection signal generator 57 which produces a sawtooth wave voltage. The vertical deflection coils 55 obtain energy for vertical deflection of the electron beam of image tube 51 from vertical deflection signal generator 59.

Cathode ray beam deflection systems are well described in the art and need no further explanation here. A suitable system is shown and described in the U. S. patent to W. A. Tolson et al., No. 2,101 520, December 7, 1937.

An indicator repeat back unit 61 which may take the form of the repeat back unit shown in Figure 1 and described above provides photocell amplifier 63 with a signal pulse whose timing with respect to the vertical synchronizing pulse is governed by the relative position of pointer 1 with respect to the reference marker 15. The output signal of the photocell amplifier 63 is combined with a sawtooth wave voltage obtained from deflection signal generator 57 in mixer 65. The combined sawtooth wave and signal pulse is fed to the clipper circuit 67 where there is obtained energy pulses only during the time interval of the signal pulse obtained from the bank of photocells in the indicator repeat back unit 61 and the peak of the sawtooth wave generated by the horizontal deflection signal generator 57. This signal is combined with the video signal applied to the control electrode of the image tube 51 to form a principal image, together with an optical representation of the indicator reading.

It is often desirable that the reading of more than one indicator be transmitted to a remote location. In Figure 3 there is shown one preferred form of this invention wherein, for the purposes of illustration, the information from two indicators may be transmitted to a remote location. Indicator #1 repeat back unit 71 furnishes energy pulses representative of the reading of the first indicator to amplifier 73.

Indicator #2 repeat back unit 75 provides energy pulses representative of the reading of the second indicator to amplifier 76. Both repeat back units 71 and 75 are driven in synchronism with the scanning operation of image tube 77 by utilizing the vertical synchronizing pulse of the associated television system. A multivibrator circuit 78 is excited by the horizontal synchronizing pulses to key amplifiers 73 and 76 at different predetermined time intervals. A multivibrator circuit used as a timing unit is shown and described beginning on page 403 of the book entitled "Principles of Television Engineering" by Donald G. Fink, 1st edition, 1940.

The associated video signal and the outputs of amplifiers 73 and 76 are combined in mixer 79 and applied to the control electrode of image tube 77.

The scanning operation of image tube 77 is controlled by the vertical deflection signal generator 81 and horizontal deflection signal generator 83.

In Figure 4 there is shown still another form of this invention wherein the horizontal synchronizing pulse is applied through a keyer 91 to the amplifier tube 93, which is utilized to amplify the signal pulses obtained from the photocells 95. The photocells 95 are a part of an indicator repeat back unit such as shown and described under Figure 1, including the bank of photocells 13 of Figure 1.

By introducing the keying signal into the photocell amplifier supply voltage, a higher upper limit frequency characteristic of the photocell amplifier will be required, but the necessity for a low frequency response of the circuit will be eliminated. The elimination of the low frequency response will reduce the possibility of microphonic distortion.

The output signal of the amplifier tube 93 is passed through a clipper circuit 97 in order to obtain a signal only during the time interval occupied by both the horizontal synchronizing pulses and the energy pulses obtained from the photocells 95. The signal obtained from the clipper 97 is combined with the associated video signal in mixer 99 to form a composite signal.

Turning now to Figure 5, there is shown a form of this invention in which a common frequency power supply source 103 is available to excite repeat back unit 105, marker keyer 107, and a circular deflection signal generator.

The indicating device 109 is provided with deflecting coils 111 and 113, which are energized by the circular scanning wave generator comprising a center tapped transformer secondary 115, which provides transformers 117 and 119 with sine wave voltages 90° out of phase as a result of the capacity 121 and resistance 123 located in the primary circuits of transformers 117 and 119 respectively.

The energy pulses from the repeat back unit 105 are transmitted to a clipper tube 125 through amplifier 127 and a low frequency signal transmission system 129 which may, for example, take the form of a commercial telephone line. The output signal from the clipper tube 125 is combined with the scanning voltage in tubes 131 and 133 to provide a deflection voltage whose timing with respect to the scanning voltages is representative of the reading of the indicating device at the repeat back unit 105.

Reference marks on indicating device 109 are obtained by inserting in the scanning voltage circuit a series of pulses obtained by the marker keyer 107. Phasing of the pulses obtained from marker keyer 107 may be made to provide marker deflections in a direction opposite to the deflection representative of the indicator reading, as shown on the face of the indicating device 109.

Having thus described my invention, what is claimed is:

1. A telemetering system comprising in combination an indicating device having a movable mechanical pointer and a background associated therewith, said pointer and its associated background having contrasting light shades, a second mechanical pointer rotatable about its axis at a predetermined rate of rotation, said second pointer and its associated background having contrasting light shades, an optical lens positioned intermediate said pointers, said pointers and said lens so positioned along an optical axis such that the optical image of the plane of movement of one of said pointers is focused at the plane of movement of the other of said pointers, a lamp positioned adjacent one of said pointers to illuminate said pointer, a light sensitive device positioned adjacent the other of said pointers, a remote indicating device controlled in synchronism with said predetermined rate of rotation of said second pointer, and a signal transmission circuit between said light sensitive device and said remote indicating device to control said remote indicating device in accordance with the illumination of said pointer adjacent said light sensitive device.

2. A telemetering system comprising in combination an indicating device having a movable pointer and a background associated therewith, said pointer of a lighter shade than its associated dial, a second pointer rotatable about its axis at a predetermined rate of rotation, said second pointer of a lighter shade than its associated background, an optical lens positioned intermediate said pointers, said pointers and said lens so positioned along an optical axis such that the optical image of the plane of movement of one of said pointers is focused at the plane of movement of the other of said pointers and wherein the planes of rotation of both pointers are perpendicular to said optical axis, a lamp positioned adjacent one of said pointers to illuminate said pointer, a light sensitive device positioned adjacent the other of said pointers, a remote indicating device controlled in synchronism with said predetermined rate of rotation of said second pointer, and a signal transmission circuit between said light sensitive device and said remote indicating device to control said remote indicating device in accordance with the position of the pointer on said indicating device.

3. A telemetering system comprising in combination an indicating device having a movable pointer and a background associated therewith, said pointer and its associated background having contrasting light shades, a reference mark in said background, a second pointer rotatable about its axis at a predetermined rate of rotation, the axis of rotation of both pointers being coincident, said second pointer and its associated background having contrasting light shades, an optical lens positioned intermediate said pointers, said pointers and said lens so positioned along an optical axis such that the optical image of one of said pointers is focused at the plane of movement of the other of said pointers, means for illuminating one of said pointers, a light sensitive device positioned adjacent the other of said pointers, a remote indicating device controlled in synchronism with said predetermined rate of rotation of said second pointer, and a signal transmission circuit between said light sensitive device and said remote indicating device to control said remote indicating device in accordance with the position of said pointer adjacent said light sensitive device.

4. A telemetering system comprising in combination an indicating device having a pointer movable about one of its ends and a background associated therewith, said pointer and its associated background having contrasting light shades, a reference mark in said background and of a contrasting light shade with respect to its associated background, a second pointer rotatable about one of its ends at a predetermined rate of rotation, said second pointer and its associated background having contrasting light shades, an optical lens positioned intermediate said pointers, said pointers and said lens so positioned along an optical axis such that the optical image of the plane of movement of one of said pointers is focused at the plane of movement of the other of said pointers and wherein the image of the axis of rotation corresponds to the axis of rotation of the other pointer, a source of illumination adjacent one of said pointers to illuminate said pointer, a light sensitive device positioned adjacent the other of said pointers, a remote indicating device controlled in synchronism with said predetermined rate of rotation of said second pointer, and a signal transmission circuit between said light sensitive device and said remote indicating device to control said remote indicating device in accordance with the position of said pointer of said indicating device.

5. A telemetering system comprising in combination an indicating device having a pointer rotatable about an axis and a background associated therewith, said pointer and its associated background having contrasting light shades, a second pointer rotatable about said axis, a synchronous driving motor for said second pointer, said motor adapted to receive its energy from a common frequency power supply source, said second pointer and its associated background having contrasting light shades, an optical lens positioned intermediate said pointers, the axis of rotation of said pointers and said lens positioned such that the optical image of the plane of movement of one of said pointers is focused at the plane of movement of the other of said pointers, a lamp positioned adjacent one of said pointers and shaded from the other of said pointers to illuminate said adjacent pointer, a light sensitive device positioned adjacent the other of said pointers, a remote indicating device having a cathode ray beam, a deflection signal generator for deflecting said beam, said deflection signal generator adapted to receive its frequency of operation from said common frequency power supply source, and a signal transmission circuit between said light sensitive device and said remote indicating device to control the in-tensity of said electron beam in accordance with the position of said pointer adjacent said light sensitive device.

6. A telemetering system comprising in combination an indicating device having a pointer rotatable about its end as an axis and a background associated therewith, said pointer and its associated background having contrasting light shades, a second pointer rotatable about its end at a predetermined rate of rotation, said second pointer and its associated background having contrasting light shades, an optical lens positioned intermediate said pointers, said pointers and said lens so positioned along an optical axis such that the optical image of the plane of movement of one of said pointers is focused at the plane of movement of the other of said pointers and wherein the axis of the pointer corresponds with the image of the axis of the other pointer, a lamp positioned adjacent one of said pointers to illuminate said pointer, a light sensitive device positioned adjacent the other of said pointers, a remote indicating device controlled in synchronism with said predetermined rate of rotation of said second pointer, a signal transmission circuit between said light sensitive device and said remote indicating device to control said remote indicating device in accordance with the illumination of said pointer adjacent said light sensitive device, and means for producing a scale on said remote indicating device in accordance with said predetermined rate of rotation.

WALDEMAR J. POCH.

REFERENCES CITED

The following references are of record in the file of this patent:

UNITED STATES PATENTS

| Number | Name | Date |
|---|---|---|
| Re. 22,025 | Wald | Feb. 10, 1942 |
| 1,854,066 | Robinson | Apr. 12, 1932 |
| 2,070,651 | Dowsett | Feb. 16, 1937 |
| 2,110,746 | Tolson | Mar. 8, 1938 |
| 2,114,501 | Nicolson | Apr. 19, 1938 |
| 2,148,954 | Methlin | Feb. 28, 1939 |
| 2,284,873 | Kemp | Apr. 25, 1939 |
| 2,195,676 | McCarthy | Apr. 2, 1940 |
| 2,277,000 | Bingley | Mar. 17, 1942 |
| 2,298,476 | Goldsmith | Oct. 13, 1942 |
| 2,309,506 | Herbst | Jan. 26, 1943 |
| 2,319,789 | Chambers | May 25, 1943 |
| 2,323,905 | Goldmark | July 13, 1943 |
| 2,326,515 | Bartelink | Aug. 10, 1943 |
| 2,350,902 | Kallmann | June 6, 1944 |
| 2,377,902 | Relson | June 12, 1945 |
| 2,378,746 | Beers | June 19, 1945 |
| 2,402,688 | Skurnick | June 25, 1946 |
| 2,477,625 | Labin | Aug. 2, 1946 |
| 2,406,858 | Shepherd | Sept. 3, 1946 |
| 2,425,066 | Labin | Aug. 5, 1947 |
| 2,425,314 | Hansell | Aug. 12, 1947 |
| 2,429,613 | Deloraine | Oct. 28, 1947 |
| 2,431,591 | Snyder, Jr. | Nov. 25, 1947 |
| 2,437,300 | Labin | Mar. 9, 1948 |
| 2,480,868 | Marshall | Sept. 6, 1949 |

FOREIGN PATENTS

| Number | Country | Date |
|---|---|---|
| 553,286 | Great Britain | May 14, 1943 |